June 5, 1951
W. D. MACGEORGE
2,555,355
STRESS TELEMETERING SYSTEM
Filed Nov. 9, 1943
2 Sheets-Sheet 1
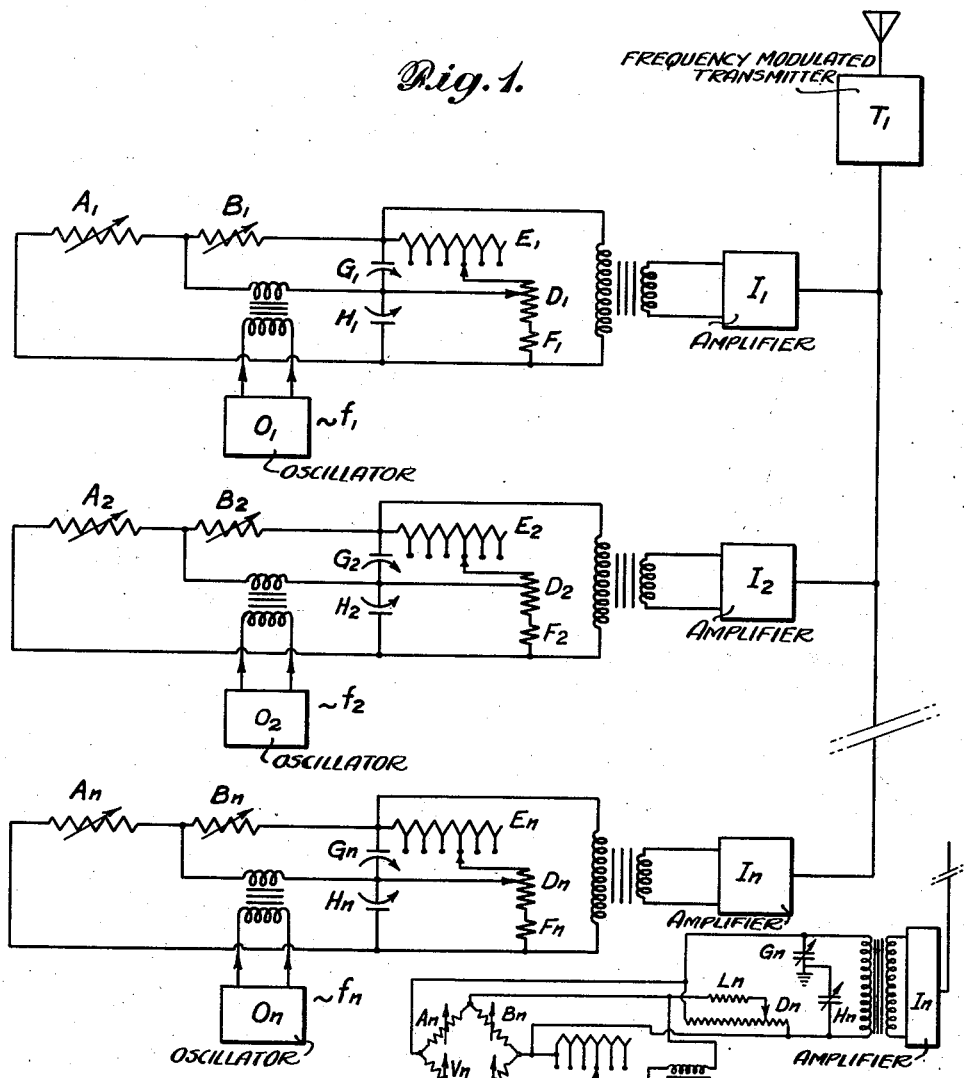
Fig. 1.
Fig. 1a.
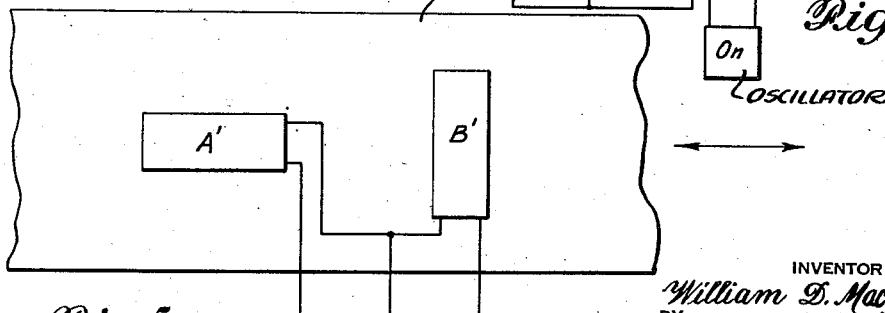
Fig. 5.
INVENTOR
William D. Macgeorge,
BY
ATTORNEY June 5, 1951  W. D. MACGEORGE  2,555,355
STRESS TELEMETERING SYSTEM
Filed Nov. 9, 1943  2 Sheets-Sheet 2

INVENTOR
William D. Macgeorge,
BY
ATTORNEY

Patented June 5, 1951

2,555,355

UNITED STATES PATENT OFFICE 2,555,355

STRESS TELEMETERING SYSTEM

William D. Macgeorge, Drexel Hill, Pa., assignor to Baldwin-Lima-Hamilton Corporation, a corporation of Pennsylvania Application November 9, 1943, Serial No. 509,644

2 Claims. (Cl. 73—88.5)

(Granted under the act of March 3, 1883, as amended April 30, 1928; 370 O. G. 757)

This invention relates to the measurement of the stresses in an aircraft structure, the simultaneous transmission of these measurements, by means of radio, to a remote receiving station, and the simultaneous indication and recording of these measurements at the receiving station.

It is the object of this invention to provide a simple and accurate means and method for structurally flight testing an aircraft without locating the indicating and recording equipment in the plane and, in the case of a remotely controlled aircraft, without the help of a test pilot.

A further object is to provide a telemetering system for measuring stresses at various points in an aircraft structure in flight during various maneuvers and altering conditions, and simultaneously transmitting these measurements to, and indicating and recording them at a remote observation station.

A further object is to provide apparatus for the above system which may readily be adjusted for any range of stresses to be encountered at the several points during any particular test, so as to obtain the sensitivity desired.

Further and more specific objects will become apparent in the course of the following description, accompanied by the drawing, in which:

Fig. 1 is a schematic diagram of the transmitter circuits,

Fig. 1a is an alternative transmitter circuit,

Fig. 5 shows a pair of resistor elements set at right angles to each other on a member subject to stresses in corresponding directions.

Figure 2:
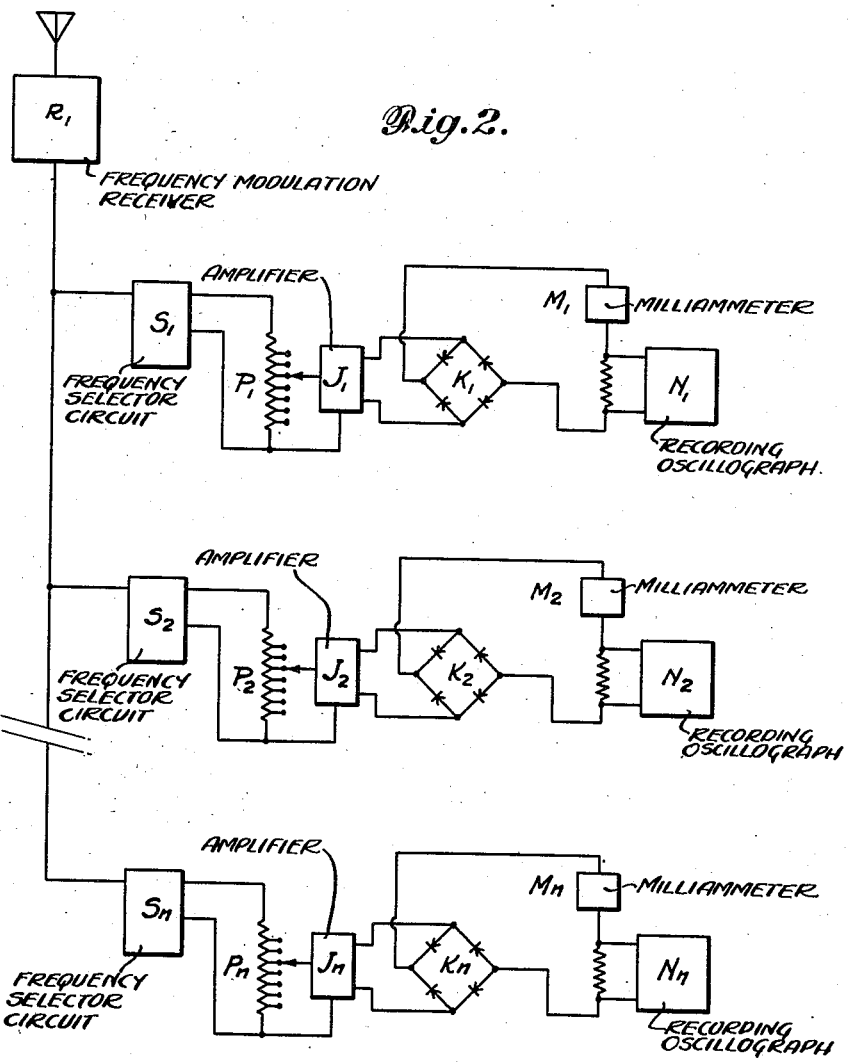
Fig. 2 is a schematic diagram of the receiver circuits of the preferred form of my invention.

In general the system herein disclosed makes use of strain sensitive bridge circuits and means for powering these circuits with sinusoidal alternating current, each circuit being supplied with a different frequency. The outputs of these bridge circuits are amplified and fed into a common transmission line.

The output of this transmission line is changed into radiated radio frequency power whose frequency will vary directly with the amplitude of the complex wave in the line and whose frequency variations will occur at a rate determined by its wave form. A frequency modulation transmitter is satisfactory for this purpose. This equipment is all mounted in the plane or other aircraft which is to undergo the tests in flight.

Means are provided for receiving the above mentioned radiated radio frequency energy at a receiving station on the ground, where the complex wave mentioned above is detected. This may be done by a frequency modulation receiver. Means are provided for then separating the received complex wave into its various sine wave components, and these components are then amplified and their amplitudes are individually indicated and recorded.

Referring now to the several figures in detail:

Strain gage resistors $A_1$, $A_2$ ... $A_n$ and $B_1$, $B_2$ ... $B_n$ are strain sensitive and will change their resistance when they are compressed or elongated. For ordinary tension and compression measurements one gage—let us say $A_1$—is mounted on the structural member to be tested and the other gage $B_1$ is mounted on an adjacent piece of unstressed metal of similar composition. These two resistors, $A_1$ and $B_1$, form two arms of a Wheatstone bridge and the type of mounting described above will maintain the balance of the bridge circuit even though both pieces of metal expand or contract due to changes in ambient temperature. On a structural member where bending is to be measured, the two strain sensitive resistors $A_1$ and $B_1$ can be attached to opposite sides of the member and when it is bent one resistor will be compressed and the other expanded. This will double the sensitivity of the bridge circuit.

The other two arms of the bridge circuit are formed by resistor $F_1$, stepped resistor $E_1$ and potentiometer $D_1$.

Power is supplied to the bridge circuits by oscillators $O_1$, $O_2$ ... $O_n$ whose output frequencies $f_1$, $f_2$ ... $f_n$ are different and which occur in a frequency band suitable for modulating the frequency modulated transmitter $T_1$.

Capacity balance of the bridge circuits is obtained by adjusting variable condensers $G_1$, $G_2$ ... $G_n$ and $H_1$, $H_2$ ... $H_n$ or both.

With the unstressed structural member or members to be tested, the various bridges are adjusted until their individual outputs are at a minimum. This balance is obtained by adjusting potentiometers $D_1$, $D_2$ ... $D_n$ and variable condensers $G_1H_1$, $G_2H_2$ ... $G_nH_n$. Thereafter any stress in the structural member or members under test will unbalance their respective bridge circuits and cause an output of $f_1$, $f_2$ ... $f_n$ cycles to occur per second. The amplitude of the various frequencies $f_1$, $f_2$ ... $f_n$ will depend on the degree of bridge unbalance and therefore on the stress being measured.

The output signals mentioned above will be amplified by amplifiers $I_1, I_2 \ldots I_n$, combined and then fed into the input circuit of frequency modulated transmitter $T_1$. The input to $T_1$ will then consist of a complex wave composed of individual sine waves $f_1, f_2 \ldots f_n$. As mentioned above, the amplitude of the component sine waves will be determined by the stress unbalancing the bridge circuit which is their source. This complex wave is used to modulate transmitter $T_1$ and reappears again in the output of frequency modulation receiver $R_1$. If the frequency modulation radio link is properly designed the complex wave being transmitted will not be affected in amplitude or wave form by normal signal strength variations or by static.

The complex wave output of the receiver is separated into its individual sine wave components by means of frequency selector circuits $S_1, S_2 \ldots S_n$. The outputs of the selector circuits will be similar to the inputs of amplifiers $I_1, I_2 \ldots I_n$ in the transmitter. After amplification in amplifiers $J_1, J_2, \ldots J_n$ these outputs are rectified by rectifiers $K_1, K_2 \ldots K_n$ and used to actuate milliammeters $M_1, M_2 \ldots M_n$ and recording oscillographs $N_1, N_2 \ldots N_n$. In this manner, changes in stress can be transmitted, indicated and recorded.

Stepped resistors $E_1, E_2 \ldots E_n$ in the bridge circuits are used for calibrating purposes and for operating the bridge circuits at a known stress above zero equivalent to the maximum reverse stress that may be expected, so that an indication of a reversal, in stress can be transmitted, indicated and recorded. To accomplish this the ohmic value of these steps must correspond to the change in resistance of strain resistors $A_1, A_2 \ldots A_n$ for certain differences in the ranges of strain expected to be encountered by the respective members during any series of tests.

Attenuators $P_1, P_2 \ldots P_n$ are provided in the receiving amplifier circuits so that the gain of these circuits and the resulting indications and records may be adjusted by known amounts to suit the range of stresses being measured.

The frequencies to be used in supplying the bridge circuits, $f_1, f_2 \ldots f_n$, must be chosen so that each selector circuit in the receiving unit will respond to only one of them, and little or no mixing will occur.

Figure 3:
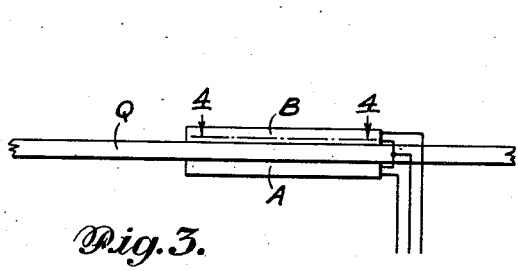
Fig. 3 shows one application of the resistor elements to a strut or other member subject to bending as well as linear stresses.

Fig. 3 illustrates an arrangement of the resistor elements A and B especially adapted to respond to bending stresses in the strut Q, since bending will produce opposite reactions on the two elements and the resulting unbalance will be cumulative and, therefore, more pronounced, so that a greater unbalance in the bridge circuit can be obtained from the same bending stress than if measured by a single element applied to only one side of the strut. However, by connecting the two elements shown in parallel or just one of them on one leg of the bridge circuit, and using another equivalent resistance positioned on the strut at right angles thereto on the other leg, as shown in Fig. 5 at B', the linear stresses of tension or compression can be measured.

Fig. 5 illustrates the arrangement of the resistor elements on a longeron U for measuring linear stresses on the surface thereof. For laminated or hollow members, these resistor elements are readily mounted between laminations or on the inside of the hollow members to obtain the internal stresses of the members at any desired points thereof.

Figure 4:
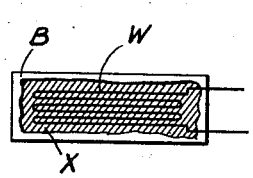
Fig. 4 is a plan view of one of the resistor elements with its covering of cement partly broken away to show the arrangement and shape of the wire.

Fig. 4 shows one of the resistor elements B in section taken at 4—4 of Fig. 3. The resistance wire W is shown formed with the maximum portion of its length in a common direction so as to obtain the maximum effect on the wire by the stresses in the direction in which they are desired to be measured. The wire is imbedded in a cement X which readily follows the strains or deformations of the member to which the element is applied but holds the wire firmly against the member without permitting slippage therebetween.

Fig. 1a shows a four-arm telemetering transmitter circuit in which all four gages $A_n, B_n, V_n$ and $F_n$ which specifically may be of the type shown in Simmond Patent No. 2,292,549 are attached to the structure to be tested, and are so arranged that their unbalance is cumulative, as shown e. g. in Fig. 3 in case of bending stresses, or that undesirable strains are cancelled as shown e. g. in Fig. 5, by connecting a strained gage and an unstrained one close to it in opposite sides of the bridge circuit so as to cancel the effect of incidental strains in both gages due to changes in temperature. In aircraft stress measurements it is often desirable to utilize all four arms in a bridge circuit of this form. The power is supplied by oscillator $O_n$. The bridge balance is controlled by potentiometer $D_n$. The resistor $L_n$, in series with the arm of the potentiometer $D_n$, controls the effective range of the bridge balance adjustment. Stepped resistor $E_n$ is shunted across bridge arm $F_n$ and is used as a calibrator. Each position of $E_n$ changes the resistance of $F_n$ by a definite amount. Variable condensers $G_n$ and $H_n$ provide the necessary capacity balance for the bridge circuit.

Obvious changes in form and dimensions as well as arrangement may be made without departing from the scope of the present invention as defined by the appended claims.

The invention described herein may be manufactured and used by or for the Government of the United States of America for governmental purposes without the payment of any royalties thereon or therefor.

What is claimed is:

1. A system for simultaneously recording at a ground station a plurality of flight test data obtained from an aircraft in flight comprising a plurality of strain responsive elements each adapted to be connected to a part of the aircraft to be tested, a plurality of circuits, each circuit including one of said elements, means for simultaneously supplying alternating current of a different frequency to each of said circuits, the electrical output of each circuit being proportional to the strain in its associated part, means for simultaneously combining the outputs of said circuits, means responsive to said combined output for transmitting a complex frequency modulated wave to the ground station, a receiver at the station for receiving the complex wave and having means for converting the wave into its original components, and means for simultaneously and continuously indicating the instantaneous amplitudes of each of the components.

2. A system for simultaneously recording at a ground station a plurality of flight test data obtained from an aircraft in flight comprising a plurality of electrical bridge networks in the aircraft, at least one element of each of said networks being a strain responsive variable impedance adapted to be connected to a part of the aircraft to be tested, means for simultaneously supplying alternating current of a different frequency to the input of each of said networks, means for simultaneously combining the outputs of said networks, means controlled by said combined output for transmitting a complex frequency modulated wave to the ground station, means at the station for receiving and converting said wave into its original components, and means for simultaneously and continuously indicating the instantaneous amplitudes of each of the components.

WILLIAM D. MACGEORGE.

REFERENCES CITED

The following references are of record in the file of this patent:

UNITED STATES PATENTS

| Number | Name | Date |
|---|---|---|
| Re. 19,107 | Hammond | Mar. 13, 1934 |
| 1,633,100 | Heising | June 21, 1927 |
| 2,063,610 | Linsell | Dec. 8, 1936 |
| 2,378,395 | Dickson | June 19, 1945 |

OTHER REFERENCES

Publication III, Aircraft Engineering, June, 1943, pp. 174–177.

Publication I, "Automotive and Aviation Industries," June 1, 1942, pp. 40–43.

Publication II, "Automotive and Aviation Industries," page 38, Jan. 1, 1943.